United States Patent
Chang et al.

(10) Patent No.: US 8,264,828 B2
(45) Date of Patent: Sep. 11, 2012

(54) ELECTRONIC DEVICE WITH ADJUSTABLE OPERATION MODES

(75) Inventors: Ching-Tsai Chang, Taipei County (TW); Kuang-Liang Chen, Taoyuan County (TW)

(73) Assignee: Elitegroup Computer Systems Co., Ltd., Neihu District, Taipei (TW)

(*) Notice: Subject to any disclaimer, the term of this patent is extended or adjusted under 35 U.S.C. 154(b) by 241 days.

(21) Appl. No.: 12/839,549

(22) Filed: Jul. 20, 2010

(65) Prior Publication Data

US 2011/0038108 A1 Feb. 17, 2011

(30) Foreign Application Priority Data

Aug. 14, 2009 (TW) .............................. 98127512 A

(51) Int. Cl.
*H05K 5/00* (2006.01)
*H05K 7/00* (2006.01)
(52) U.S. Cl. ......... 361/679.28; 361/679.06; 361/679.07; 361/679.27; 361/679.29
(58) Field of Classification Search ............ 361/679.06, 361/679.07, 679.27, 679.28, 679.29
See application file for complete search history.

(56) References Cited

U.S. PATENT DOCUMENTS

| | | | | |
|---|---|---|---|---|
| 5,729,429 A | * | 3/1998 | Margaritis et al. | 361/679.28 |
| 6,262,885 B1 | * | 7/2001 | Emma et al. | 361/679.05 |
| 6,430,038 B1 | * | 8/2002 | Helot et al. | 361/679.05 |
| 2006/0039104 A1 | * | 2/2006 | Wang et al. | 361/681 |
| 2007/0058331 A1 | * | 3/2007 | Schwager et al. | 361/683 |
| 2007/0159783 A1 | * | 7/2007 | Chen et al. | 361/683 |

FOREIGN PATENT DOCUMENTS

TW 393957 6/2000
* cited by examiner

*Primary Examiner* — Anthony Haughton
(74) *Attorney, Agent, or Firm* — Winston Hsu; Scott Margo

(57) ABSTRACT

An electronic device comprises a base, a system module, and at least one axle pivot structure. The axle pivot structure connects the base and the system module, and the axle pivot structure comprises an axle shaft, a first pivotal connection portion, and a second pivotal connection portion. The axle shaft comprises a first end portion and a second end portion. The first pivotal connection portion is pivotally disposed to the first end portion of the axle shaft and the center of the lateral side of the base. The second pivotal connection portion is pivotally disposed on the second end portion of the axle shaft and one lateral side of the system module. Besides, the axle shaft is rotated with respect to the base, and the system module is rotated with respect to the axle shaft, so the different disposed location and disposed angle of the system module can be formed.

15 Claims, 9 Drawing Sheets

ELECTRONIC DEVICE WITH ADJUSTABLE OPERATION MODES

FIELD

The present invention relates to a field of electronic device with adjustable operation modes. More specifically, the exemplary embodiments of the present invention relates to a axle pivot structure disposed between a system module and a base of an electronic device in order to adjust the system module to a different disposed angle with respect to the base.

BACKGROUND

As the growing of the technology and the demand of mobile computing, a portable notebook computer is well-developed and allow user manipulate the notebook computer anywhere.

Because the notebook computer has become more and more powerful, the notebook computer can play MPEG1 format, MPEG2 format, or high definition videos. Besides, as the development of touch screen, some notebook computer computers already has adopted the touch panels to allow users to operate by touching the screen. Thus, modern notebook computer has been equipped with variety of functions to fulfill users' requirement.

Because the conventional notebook computer usually utilizes rotation axle to pivotally connect the base and the display of the notebook computer, this kind of notebook computer has the opening and closing structure like a book. User of the notebook computer must to rotate the display to certain angle in order to watch the screen comfortably and not to apply pressure to the user's shoulder and upper back. However, if the available space, such as airplane cabin, is limited, the notebook computer can only be operated on the lap and the best view angle of the screen may not be achieved.

Moreover, to this book structure of the notebook computer, the opened display has a distance to the user and can not be adjusted to the best view angle.

To improve the aforementioned drawbacks of the conventional notebook computer and fulfill the requirements of the touch screen, which are more and more common these days, TW Patent 393957 discloses a method connecting the base and the display of the notebook computer by radial arm, as shown on FIG. 1. The display in FIG. 1 is a touch screen. One end of the radial arm 16 of the notebook computer is pivotally connected to one end of the base 12, and the other end of the radial arm 16 of the notebook computer is pivotally connected to the center of two sides of the display 14. The user can operate this kind of notebook computer by pushing the display 14 to the front, thus to watch videos. On the other hand, the user can turn the display 14 toward outside of the base to operate the notebook computer by touching the screen.

However, the drawback of this kind of notebook computer is that the connecting joint of the radial arm 16 and the display 14 is located on the center of the two sides of the display, and thus occupying the lateral space of the display 14. Due to most of the notebook computers are equipped with the antenna for wireless internet or the webcam, and the antenna or the webcam need to be disposed on the side of the display, the aforementioned notebook computer with rotation structure will intrude the available space of the antenna or the webcam so as to result a design problem.

Furthermore, the display of the aforementioned notebook computer needs to be installed near the center of the base when the display is placed ahead. As a result, the keyboard layout disposed on base must be designed toward the front of the base, and thus restrict the disposed space of the touchpad and the trackball. Also, the palmrest area might be narrowed or even canceled. Hence, the aforementioned notebook computer is lack of compatibility due to the deficiency of the palmrest area.

SUMMARY

In view of the problems of the conventional rotatable notebook computer, the object of the present invention is providing an electronic device with adjustable operation modes, which provides a variety of display modes without changing the original layout of the keyboard.

According to an object of the present invention, an electronic device with adjustable operation modes is rendered. The electronic device comprises a base, a system module, and at least one axle pivot structure. The axle pivot structure connects the base and the system module, and the axle pivot structure comprises an axle shaft, a first pivotal connection portion, and a second pivotal connection portion. The axle shaft comprises a first end portion and a second end portion. The first pivotal connection portion is pivotally disposed on the first end portion of the axle shaft and the center of the lateral side of the base to pivotally connect the axle shaft and the base. The second pivotal connection portion is pivotally disposed on the second end portion of the axle shaft and one lateral side of the system module to pivotally connect the axle shaft and the system module. Besides, the axle shaft is rotated with respect to the base by the first pivotal connection portion, and the system module is rotated with respect to the axle shaft by the second pivotal connection portion, so the different disposed location and disposed angle, with respect to the base, of the system module can be formed.

Moreover, the system module is rotated around one end portion of the axle shaft at angles up to 360° through the second pivotal connection portion, and the axle shaft is rotated around the base at angles up to the straight angle through the first pivotal connection portion.

Furthermore, the lateral side of the base comprises a first end and a second end, and the system module comprises a display unit disposed on one side thereof.

Moreover, the axle shaft defines a first auxiliary line, and the first auxiliary line is disposed through the first pivotal connection portion and the second pivotal connection portion to determine that the system is in the first operation zone or in the second operation zone by identifying the orientation, with respect to the first auxiliary line, of the system module. The axle shaft and the base defines a second auxiliary line, and the second auxiliary line is disposed through the first pivotal connection portion and perpendicular to the base to determine that the system is in the third operation zone or in the fourth operation zone by identifying the orientation, with respect to the second auxiliary line, of the axle shaft.

Besides, when the electronic device is in a closed mode, the system module is disclosed on the base and located in the first operation zone, the axle shaft is located at the fourth position, the display unit faces the base, and the second pivotal connection portion corresponds to the second end.

Also, when the electronic device is in a normal operation mode, an operation angle is formed between the system module and the base, the system module is located in the first operation zone, the axle shaft is located in the fourth operation zone, the axle shaft is located in the fourth operation zone, and the second pivotal connection portion corresponds to the second end.

Moreover, when the electronic device is in a laptop operation mode, the system module is located in the second operation zone, the axle shaft is located in the third operation zone, and the axle shaft is rotated to form an operation angle between the base and the axle shaft to make the system module out of contact with the base.

Furthermore, when the electronic device is in a video display mode, the second pivotal connection module corresponds to the first end, the system module is located in the second operation zone, the axle shaft is located in the third operation zone, and the second pivotal portion corresponds to the first end.

Further, when the electronic device is in a touch operation mode, the system module is located in the second operation zone, the axle shaft is located in the third operation zone, the system module covers the base, the second pivotal portion corresponds to the first end, and the back of the display unit faces the base.

Moreover, the length of the axle shaft is shorter than half of the length of the lateral side of the base.

Also, the base comprises a sound producing unit, and, when the electronic device is in a closed mode, the system module covers the base, the system module is located in the first operation zone, the axle shaft is located in the fourth operation zone, and the system module uncovers and reveals the sound producing unit when the axle shaft is located in the fourth operation zone.

Besides, the base comprises an operation unit, and the system module is located in the second operation zone, the axle shaft is located in the third operation zone, the system module covers the base, the back of the display unit faces the base, and the system module uncovers the control unit and reveals the sound producing unit when the electronic device is in a touch operation mode.

Moreover, the electronic device comprises a wire disposed through the axle shaft and electrically connected to the base and the system module.

According to the aforementioned description, the electronic device in the present invention can form different disposed location and different disposed angle, with respect to the base, of the system module to provide the user with a variety of operation modes of the electronic device by disposing the axle pivot structure between the base and the system module, by having an axle shaft on the axle pivot structure, and by pivotally connecting the center of the base, the first pivotal connection portion resided on one end of the lateral side of the axle shaft, and the second pivotal connection portion resided on one end of the lateral side of the system module.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of the electronic device with adjustable operation modes.

Those of ordinary skilled in the art will realize that the following detailed description of the exemplary embodiments is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference indicators will be used throughout the drawings and the following detailed description to refer to the same or like parts.

Figure 1:
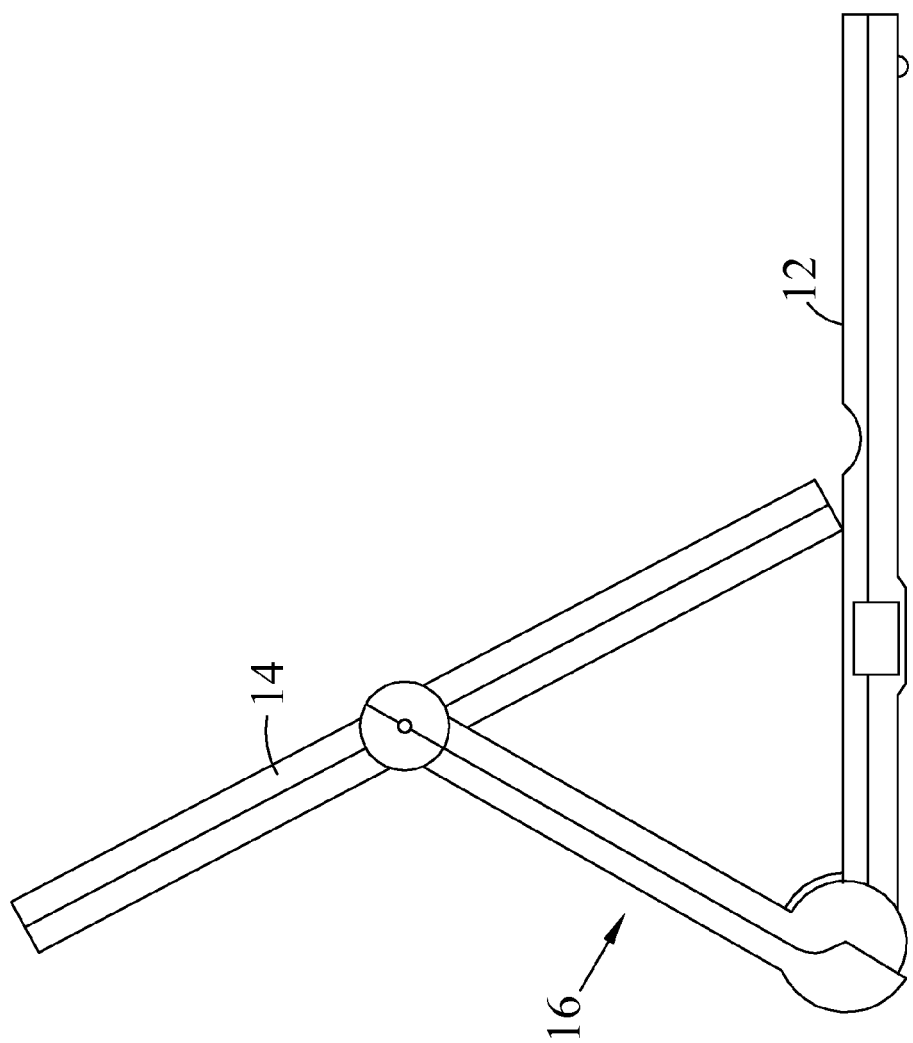
FIG. 1 illustrates a schematic view of a notebook computer in prior art.
Figure 2:
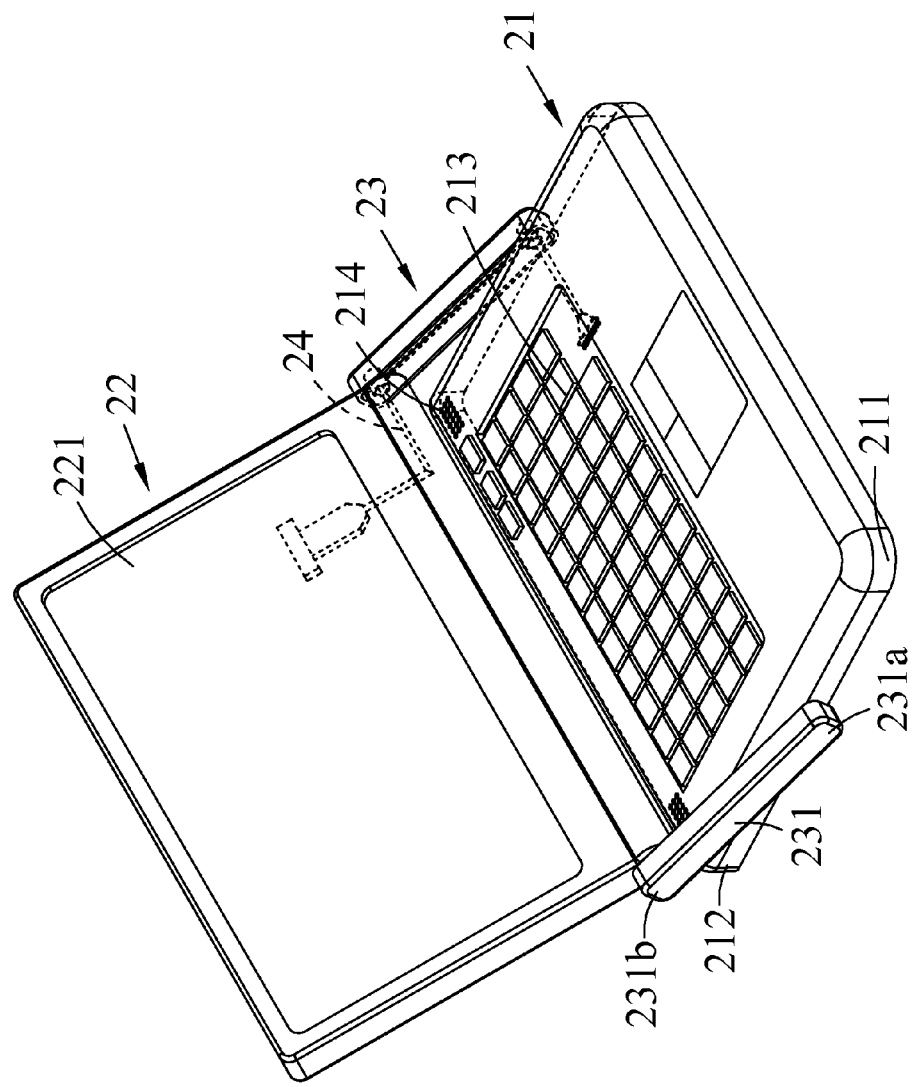
FIG. 2 illustrates a three-dimensional view of the first embodiment in accordance with the electronic device with adjustable operation modes of the present invention.
Figure 3:
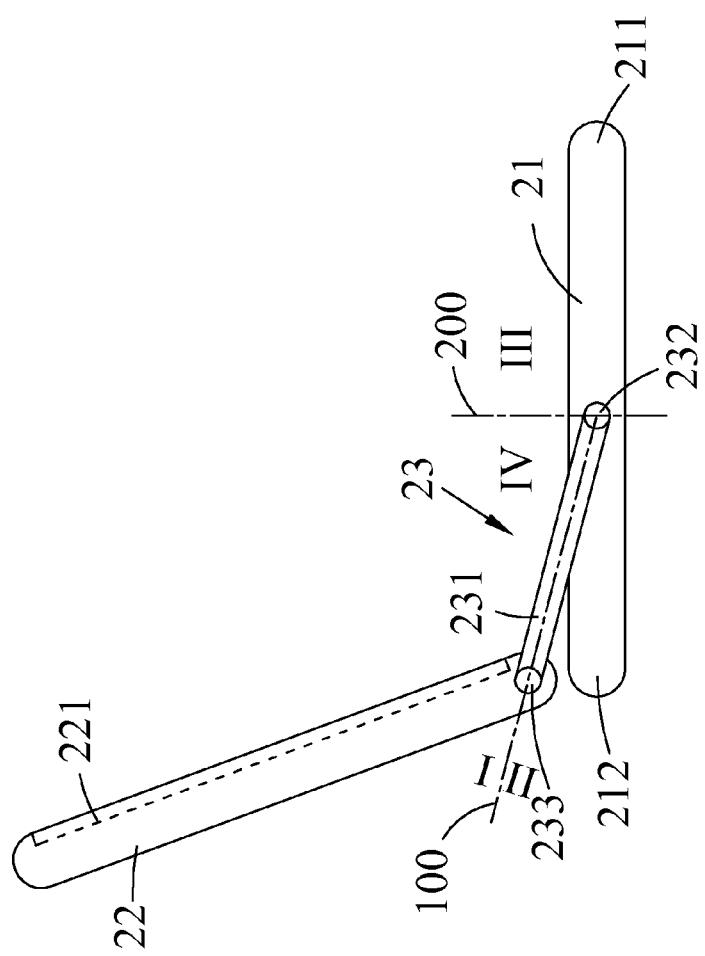
FIG. 3 illustrates a schematic view of the first embodiment in accordance with the electronic device with a normal operation mode of the present invention.

Please refer to FIG. 2 and FIG. 3. FIG. 2 is a three-dimensional view of the first embodiment in accordance with the electronic device with adjustable operation modes of the present invention. In FIG. 2, the electronic device with adjustable operation modes in accordance with the present invention comprises a base 21, a system module 22, two axle pivot structure 23, and a wire 24. Also, the electronic device may be a notebook computer or a tablet computer.

The lateral side of the base 21 comprises a first end 211 and a second end 212, and an operation unit 213 and a sound producing unit 214 are disposed thereon. The operation unit 212 may be a keyboard, a numpad, a hotkey, or a touchpad. The sound producing unit 214 may be a speaker. Besides, the base 21 may contains the internal working units (not shown), such as a central process unit (CPU), a hard disk drive(HDD), memory chip, a PC card slot, a battery, a electrical adapter, or the like.

The system module 22 comprises a display unit 221, the display unit 221 may be a normal display screen or a touch panel as requirement.

The axle pivot structure 23 is used for connecting the base 21 and the system module 22. Further, the axle pivot structure 23 comprises an axle shaft 231, a first pivotal connection portion 232, and a second pivotal connection portion 223.

The wire 24 is disposed through the axle shaft 231 and electrically connected to the base 21 and the system module 22.

The axle shaft 231 comprises a first end portion 231*a* and a second end portion 231*b*, and the length of the axle shaft 231 is about half of the length of the lateral side of the base 21. The first pivotal connection portion 232 is pivotally disposed to the first end portion 231a and the center of the lateral side of the base 21 to pivotally connect the axle shaft 231 and the base 21. The second pivotal connection portion 233 is disposed on the second end portion 231b and one end of the lateral side of the system module 22 to pivotally connect the axle shaft 231 and the system module 22. Also, the axle shaft 231 may be rotated around the base 21 at angles up to the straight angle by the first pivotal connection portion 232, and the system module 22 may be rotated around one end of the axle shaft 231 at angles up to 360° by the second pivotal connection portion 233.

For easily understanding, the axle shaft 231 defines a first auxiliary line 100 passing through the first pivotal connection portion 232 and the second pivotal connection portion 233 to determine the system module 22 is located in a first operation zone (I) or a second operation zone (II) by identifying the orientation, with respect to the first auxiliary line 100, of the system module 22. As shown, the system module 22 is located on the right side of the first auxiliary line 100 when the system in the first operation zone (I), and the system module 22 is located on the left side of the first auxiliary line 100 when the system is in the second operation zone (II).

Besides, the axle shaft 231 and the base 21 define a second auxiliary line 200 passing through the first pivotal connection portion 232 and perpendicular to the base 21. When the rotation structure 23 or the system module 22 is rotated, the location of the system module 22 is in a third operation zone (III) or a fourth operation zone (IV) by identifying the orientation, with respect to the second auxiliary line 200, of the axle shaft 231. As shown, the third operation zone (III) is defined by the position of the second pivotal connection portion 233, extended from the right side of the second auxiliary line 200 to the first end 211, and the fourth operation zone (IV) is defined by the position of the second pivotal connection portion 233, extended from the left side of the second auxiliary line 200 to the second end 212.

The rotation structure 23 may be disposed in the electronic device in the present invention to rotate, with respect to the axle shaft 231, the axle shaft 231 through the first pivotal portion 232, and to rotate, with respect to the axle shaft 231, the system module 22 by the second pivotal portion 233. Thus, the present invention can adjust the system module 22 to different disposed angle, with respect to the base 21, to provide the user with a variety of operation modes, such as a normal operation mode, a laptop operation mode, a video display mode, a touch operation mode, or a closed mode.

Please refer to FIG. 3. FIG. 3 is a schematic view of the first embodiment in accordance with the electronic device with a normal operation mode of the present invention. When the user is going to process a document by the electronic device in the present invention, the electronic device may be adjusted to a normal operation mode. At this time, the system module 22 and the base 21 can form an operation angle by adjusting the rotation structure 23 and the position, with respect to the base 21, of the system module 22. As a result, the system module 22 is located in the first operation zone (I) resided on the right side of the first auxiliary line 100, the axle shaft 231 is located in the fourth operation zone (IV) resided on the left side of the second auxiliary line 200, and the second pivotal connection portion 233 corresponds to the second end 212 of the base 21.

Figure 4:
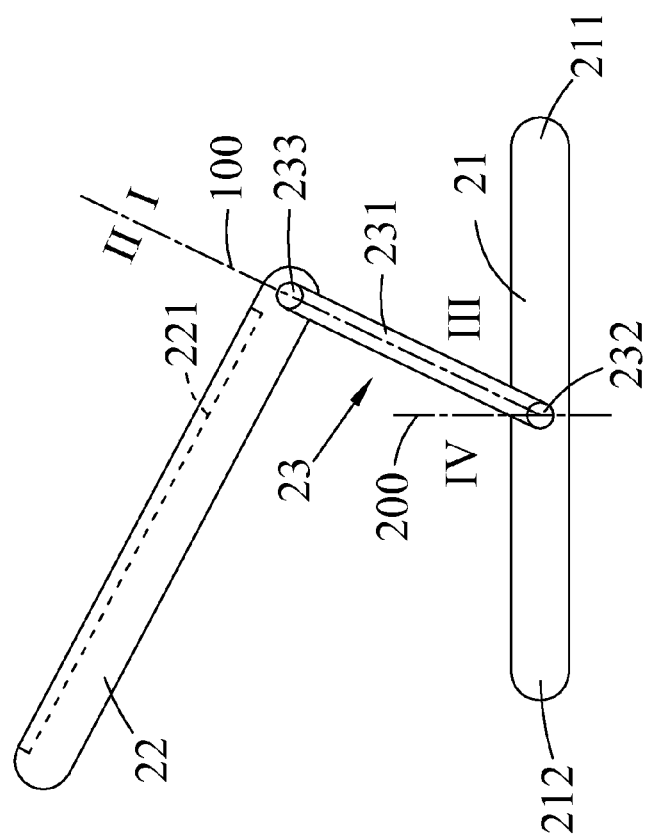
FIG. 4 illustrates a schematic view of the first embodiment in accordance with the electronic device with a laptop operation mode of the present invention.

Please refer to FIG. 4. FIG. 4 is a schematic view of the first embodiment in accordance with the electronic device with a laptop operation mode of the present invention. When the user is manipulating the electronic device in the present invention while takes the transportation, the electronic device may be adjusted to a laptop operation mode (high elevation view angle mode) due to the limited space. By adjusting the rotation structure 23 and the position, with respect to the base 21, of the system module 22, the system module 22 is located in the second operation zone (II) resided on the left side of the first auxiliary line 100, the axle shaft 231 is located in the third operation zone (III) resided on the right side of the second auxiliary line 200, and the axle shaft 231 is rotated to an operation angle with respect to the base 21 in order to make the system module 22 out of contact with the base 21. As a result, because the system module 22 is moved to a position closer to the user by the rotation structure 23, the user can manipulate the electronic device conventionally.

Figure 5:
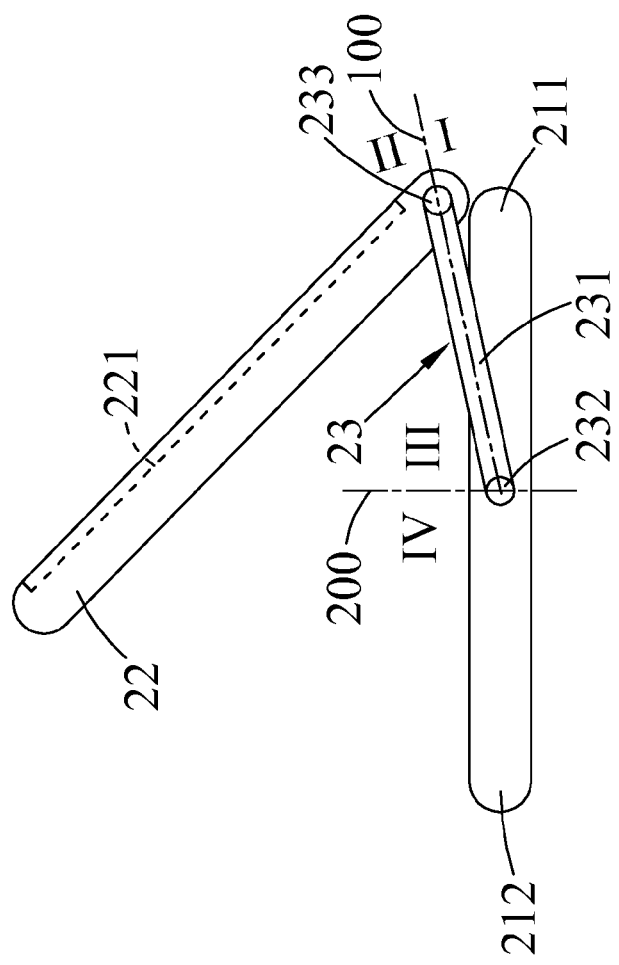
FIG. 5 illustrates a schematic view of the first embodiment in accordance with the electronic device with video display mode of the present invention.

Please refer to FIG. 5. FIG. 5 is a schematic view of the first embodiment in accordance with the electronic device with video display mode of the present invention. When the user is watching videos on the electronic device in the present invention, the electronic device may be adjusted to a video display mode. By adjusting the rotation structure 23 and the position, with respect to the base 21, of the system module 22, the second pivotal connection portion 233 corresponds to the first end 211 of the base 21, the system module 22 is located in the second operation zone (II) resided on the left side of the first auxiliary line 100, the axle shaft 231 is located in the third operation zone (III) resided on the right side of the second auxiliary line 200, and the second pivotal portion 233 corresponds to the first end 211. As a result, the display unit 221 is closer to the user and the angle between the display unit 221 and the base 21 can be adjustable easily. Hence, the user can enjoy the video on the electronic device at a comfortable view angle.

Figure 6:
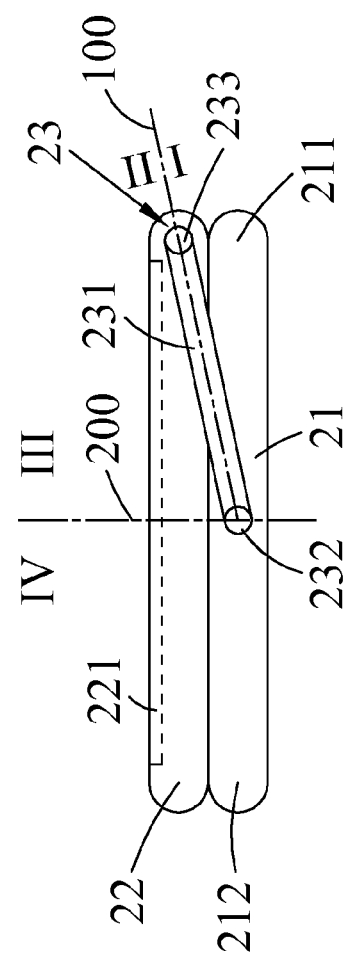
FIG. 6 illustrates a schematic view of the first embodiment in accordance with the electronic device with touch operation mode of the present invention.

Please refer to FIG. 6. FIG. 6 is a schematic view of the first embodiment in accordance with the electronic device with touch operation mode of the present invention. When the display unit 221 is a touch screen and the user manipulate the electronic device in a touch operation mode, the system module 22 is located in the second operation zone (II) resided on the left side of the first auxiliary line 100, the axle shaft 231 is located in the third operation zone (III) resided on the right side of the second auxiliary line 200, and the second pivotal portion 233 corresponds to the first end 211 of the base 21 by adjusting the rotation structure 23 and the position, with respect to the base 21, of the system module 22. As a result, the display unit 221 is facing the user (e.g. the back thereof is touch the base 21) to provide the user with input methods, such as by a touch pen or by a finger. Also, the touch screen may be a virtual keyboard showing a plurality of keys (such as QUARY) on an area of the screen to simulate the real keyboard.

Figure 7:
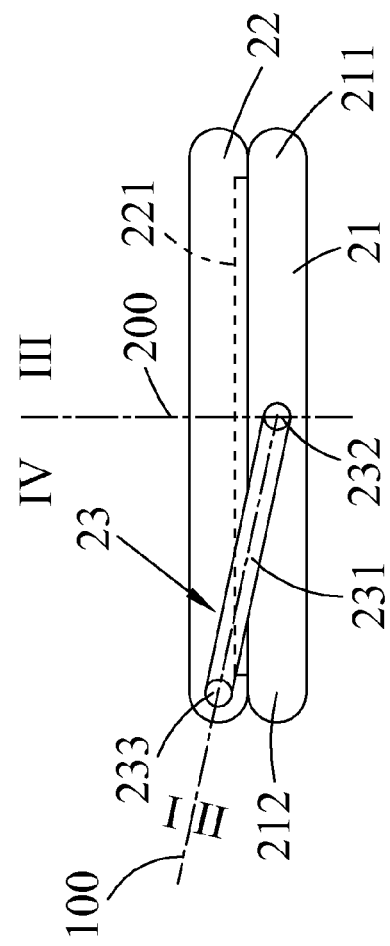
FIG. 7 illustrates a schematic view of the first embodiment in accordance with the electronic device with closed operation mode of the present invention.

Please refer to FIG. 7. FIG. 7 is a schematic view of the first embodiment in accordance with the electronic device with closed operation mode of the present invention. When the user is not using the electronic device, the electronic device may be disposed in a closed mode. In the closed mode, the system module 22 covers the base 21 and the display unit 221 faces the base 21 by adjusting the rotation structure 23 and the position, with respect to the base 21, of the system module 22. As a result, the system module 22 is located in the first operation zone (I) resided on the right side of the first auxiliary line 100, the axle shaft 231 is located in the third operation zone (IV) resided on the left side of the second auxiliary line 200, and the second pivotal portion 233 corresponds to the second end 212.

Figure 8:
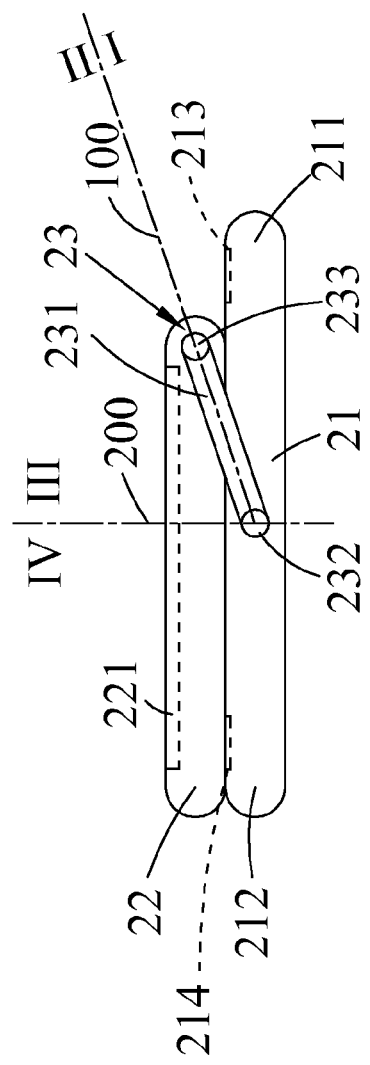
FIG. 8 illustrates a schematic view of the second embodiment in accordance with the electronic device with a touch operation mode of the present invention.
Figure 9:
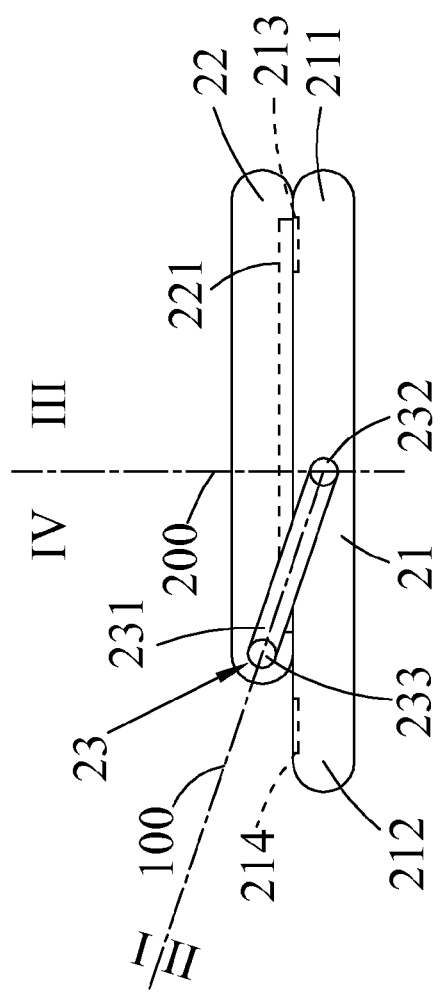
FIG. 9 illustrates a schematic view of the second embodiment in accordance with the electronic device with a closed mode of the present invention.

Please refer to FIG. 8 and FIG. 9. The FIG. 8 and FIG. 9 are schematic views of the second embodiment in accordance with the electronic device with a touch operation mode and a closed mode, respectively, of the present invention. In the second embodiment, the base 21 and the system module 22 are the same as the first embodiment and not mentioned hereinafter. The differences between the first embodiment and the second embodiment are that the length of the axle shaft 231 is shorter than half of the length of the lateral side of the base 21, and the length of the lateral side of the system module 22 is shorter than the length of the lateral side of the base 21.

As shown in FIG. 8, when the electronic device is in a touch operation mode, the electronic device may be disposed in a closed mode. In the closed mode, the system module 22 is located in the second operation zone (II) resided on the left side of the first auxiliary line 100, the axle shaft 231 is located in the third operation zone (III) resided on the right side of the second auxiliary line 200, the system module 22 covers the base 21, and the back of the display unit 221 faces the base 21 by adjusting the rotation structure 23 and the position, with respect to the base 21, of the system module 22. Because the length of the lateral side of the system module 22 is shorter than the length of lateral side of the base 21, the system module 22 uncovers and reveals the operation unit 213. In this way, the user can not only touch the display unit 221 to manipulate the electronic device in the present invention but also use the operation unit 213, such as a hotkey, to control the electronic device in the present invention as assistance.

As shown in FIG. 9, when the electronic device is in a closed mode, the system module 22 is located in the first operation zone (I) resided on the right side of the first auxiliary line 100, and the axle shaft 231 is located in the fourth operation zone (IV) resided on the left side of the second auxiliary line 200 by adjusting the rotation structure 23 and the position, with respect to the base 21, of the system module 22. Because the system module 22 uncovers and reveals the sound producing unit 214, the user can listen to the music in the closed mode.

According to the aforementioned description, the electronic device in the present invention can form different disposed location and different disposed angle, with respect to the base, of the system module to provide the user with a variety of operation mode of the electronic device by disposing the axle pivot structure between the base and the system module.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. An electronic device with adjustable operation modes, comprising:
   a base;
   a system module; and
   at least one axle pivot structure connecting the base with the system module, the axle pivot structure comprising:
      an axle shaft comprising a first end portion and a second end portion;
      a first pivotal connection portion pivotally disposed on the first end portion and the center of a lateral side of the base to pivotally connect the axle shaft with the base; and
      a second pivotal connection portion pivotally disposed on the second end portion and the center of the lateral side of the system module to pivotally connect the axle shaft with the system module;
   wherein the axle shaft is swirled with respect to the base through the first pivotal connection portion, and the system module is swirled with respect to the axle shaft through the second connection portion to dispose the system module at different positions and to form different angles between the base and the system module.

2. The electronic device with adjustable operation modes of claim 1, wherein the system module has a rotatable freedom of 360° through the second pivotal connection portion, and the axle shaft has a rotatable freedom of 180°.

3. The electronic device with adjustable operation modes of claim 1, wherein the lateral side of the base comprises a first end and a second end, and the system module comprises a display unit disposed on one side of the system module.

4. The electronic device with adjustable operation modes of claim 3, wherein the axle shaft defines a first auxiliary line, and the position of the system module with respect to the first auxiliary line defines a first operation zone and a second operation zone, the axle shaft and the base define a second auxiliary line, and the position of the axle shaft with respect to the second auxiliary line defines a third operation zone and a fourth operation zone.

5. The electronic device with adjustable operation modes of claim 4, wherein the right side of the first auxiliary line is the first operation zone, the left side of the first auxiliary line is the second operation zone, the right side of the second auxiliary line is the third operation zone, and the left side of the auxiliary line is the fourth operation zone.

6. The electronic device with adjustable operation modes of claim 5, wherein, when the electronic device is in a closed mode, the system module covers the base, the system module is located in the first operation zone, the axle shaft is located at the fourth position, the display unit faces the base, and the second pivotal connection portion corresponds to the second end.

7. The electronic device with adjustable operation modes of claim 5, wherein, when the electronic device is in a normal operation mode, an operation angle is formed between the system module and the base, the system module is located in the first operation zone, the axle shaft is located in the fourth operation zone, the axle shaft is located in the fourth operation zone, and the second pivotal connection portion corresponds to the second end.

8. The electronic device with adjustable operation modes of claim 5, wherein, when the electronic device is in a laptop operation mode, the system module is located in the second operation zone, the axle shaft is located in the third operation zone, and the axle shaft is rotated to form an operation angle between the base and the axle shaft to make the system module out of contact with the base.

9. The electronic device with adjustable operation modes of claim 5, wherein, when the electronic device is in a video display mode, the system module is located in the second operation zone, the axle shaft is located in the third operation zone, and the second pivotal portion corresponds to the first end.

10. The electronic device with adjustable operation modes of claim 5, wherein, when the electronic device is in a touch operation mode, the system module is located in the second operation zone, the axle shaft is located in the third operation zone, the system module covers the base, the second pivotal portion corresponds to the first end, and the back of the display unit faces the base.

11. The electronic device with adjustable operation modes of claim 5, wherein the length of the axle shaft is shorter than half of the length of the lateral side of the base.

12. The electronic device with adjustable operation modes of claim 11, wherein, when the axle shaft is located in the fourth operation zone when the electronic device is in a closed mode, the base comprises a sound producing unit, and the system module covers the base, the system module is located in the first operation zone, the axle shaft is located in the fourth operation zone, and the system module uncovers and reveals the sound producing unit.

13. The electronic device with adjustable operation modes of claim 11, wherein, when the electronic device is in a touch operation mode, the base comprises an operation unit, and the system module is located in the second operation zone, the axle shaft is located in the third operation zone, the system module covers the base, the back of the display unit faces the base, and the system module uncovers the control unit and reveals the sound producing unit.

14. The electronic device with adjustable operation modes of claim 1, further comprising a wire, the wire disposed through the axle shaft and electrically connected to the base and the system module.

15. The electronic device with adjustable operation modes of claim 11, further comprising a wire, the wire disposed through the axle shaft and electrically connected to the base and the system module.

* * * * *